United States Patent [19]

Yamaguchi et al.

[11] Patent Number: 5,436,643

[45] Date of Patent: Jul. 25, 1995

[54] METHOD AND APPARATUS OF RECORDING IMAGES ON RECORDING MEDIUM CAPABLE OF REPETITIVE RECORDINGS, USING VARIOUS RECORDING ENERGIES

[75] Inventors: Takashi Yamaguchi; Tadayoshi Ohno; Shinichi Itoh, all of Kawasaki, Japan

[73] Assignee: Kabushiki Kaisha Toshiba, Kawasaki, Japan

[21] Appl. No.: 68,219

[22] Filed: May 28, 1993

[30] Foreign Application Priority Data

May 28, 1992 [JP] Japan .................................. 4-136681

[51] Int. Cl.$^6$ ............................ B41J 2/32; B41M 5/26
[52] U.S. Cl. .................................. 347/179; 346/135.1
[58] Field of Search ................. 346/1.1, 76 PH, 76 R, 346/135.1; 359/36, 43, 44, 45; 360/59

[56] References Cited

U.S. PATENT DOCUMENTS 4,695,528  9/1987  Dabisch et al. .

FOREIGN PATENT DOCUMENTS

0167128  8/1985  Japan .
0208732  8/1989  Japan .
0050897  2/1990  Japan .

Primary Examiner—Huan H. Tran
Attorney, Agent, or Firm—Cushman Darby & Cushman

[57] ABSTRACT

An energy computing section computes recording energy when target pixels are mark dots or computes erasing energy when target pixels are space dots. A reading section reads out recording-number information specifying recording times from the magnetic recording portion of a recording medium at the time of recording a visible image. An energy compensating section compensates for the energy, computed by the computing section, based on the recording-number information from the reading section. An image recording/erasing section selectively applies the compensated energy to the recording medium through a thermal head, thereby recording a new visible image over an old one. A counter updates the recording-number information from the reading section. A recording section records the updated recording-number information on the magnetic recording portion of the recording medium as new recording-number information. It is therefore possible to always obtain a stable recorded image regardless of the number of recording/erasing cycles.

10 Claims, 6 Drawing Sheets

| NUMBER OF CYCLES | INTERNAL | RECORDING ENERGY COMPENSATION AMOUNT ΔE |
|---|---|---|
| 1 TO 5 | N1 | 0.0 mJ/mm² |
| 6 TO 9 | N2 | -2.1 mJ/mm² |
| MORE THAN 10 | N3 | -4.3 mJ/mm² |

METHOD AND APPARATUS OF RECORDING IMAGES ON RECORDING MEDIUM CAPABLE OF REPETITIVE RECORDINGS, USING VARIOUS RECORDING ENERGIES

BACKGROUND OF THE INVENTION

1. Field of the Invention

The present invention relates to a recording apparatus for recording information on a recording medium, and, more particularly, to a recording apparatus that records and erases a visible image on and from a recording medium which can thermally record and erase a visible image repeatedly.

2. Description of the Related Art

Conventionally, to obtain hard copy, an image is formed on a recording medium like paper with a developer material, such as ink or toner, which is externally supplied, or a visible image is formed on a recording layer, provided on the base material like paper, to provide a permanent image as on a thermal recording paper.

Due to the recent construction of various types of electronic networks and popularity of facsimiles and copying machines, the amount of consumption of those recording media has rapidly and excessively increased. This phenomenon has raised various social problems, such as destruction of natural environment like the destruction of forests or woods, and waste disposal. To cope with those problems, there is a strong demand for the reduction of the amount of consumption of recording media including the recycling of recording sheets. As one way to meet this demand, recording media which can repeatedly record and erase images have been receiving attention.

As a recording medium having such a characteristic, there has been proposed a recording medium which changes its state from a transparent state to a opaque state as the temperature of the recording medium rises from T1 to T2, and stays opaque even when the temperature returns to T1. When the temperature rises above T2 till T4 from T1, and then returns to T1 again, this recording medium returns to the transparent state from the opaque state and stays transparent thereafter. This transition can occur repeatedly.

With the transition from transparent state (initial) to opaque state (recording), then to transparent state (erasure) being treated as one cycle, the opaque characteristic and transparent characteristic of recording media which exhibit reversible transition between opaque and transparent states through a heat treatment will change as the number of cycles increases. This change is more prominent in the opaque characteristic. As the number of cycles increases, the recording medium tends to become opaque with lower energy. If image is recorded with the same recording energy as the initial level, the recording density would be lowered considerably or the service life through repetitive use would be shortened with the excessive power.

Recording apparatuses usually perform recording/erasing operations under almost the same given conditions regardless of the number of cycles. In the recording/erasing systems in the conventional recording apparatuses, therefore, recording/erasing can be executed on a recording medium without problems after several usages, but the recording density would become considerably low or the service life through repetitive use would be shortened when the recording medium is used scores to several hundreds times.

SUMMARY OF THE INVENTION

It is therefore an object of the present invention to provide a recording apparatus which can always attain a stable recorded image irrespective of the number of recording/erasing cycles, and which can record a new visible image over an already-recorded visible image.

According to one aspect of the present invention, there is provided a method of recording an image on a recording medium to which a first energy having a predetermined level is applied to record the image and to which a second energy different from the first energy is applied to erase the image, thereby the image being capable of recording and erasing repeatedly, the recording medium having a region to which times of recording the image is stored, said method comprising the steps of:

reading the recording times from the region of the recording medium;

compensating the first energy by changing the predetermined level from a first level to a second level in accordance with the recording times; and recording the image on the recording medium with the recording energy having the second level.

According to another aspect of the present invention, there is provided an apparatus for recording an image on a recording medium to which a first energy having a predetermined level is applied to record the image and to which a second energy different from the first energy is applied to erase the image, thereby the image being capable of recording and erasing, repeatedly, the recording medium having a region to which times of recording the image is stored, said apparatus comprising:

means for reading the recording times from the region of the recording medium;

means for compensating the first energy by changing the predetermined level from a first level to a second level in accordance with the recording times; and means for recording the image on the recording medium with the recording energy having the second level.

Recording-number information indicative of the times of recordings of a visible image is recorded on a recording medium in advance, this recording-number information is read out therefrom at the time of recording or erasing a visible image on or from the recording medium, and the recording/erasing energy is compensated based on the read recording-number information. Accordingly, a stable recorded image can always be attained irrespective of the times of recording/erasing cycles. It is also possible to record a new visible image over that visible image which has already been formed on the recording medium. In addition, recording and erasing can be executed with single energy applying means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

A preferred embodiment of the present invention will now be described referring to the accompanying drawings.

Figure 1:
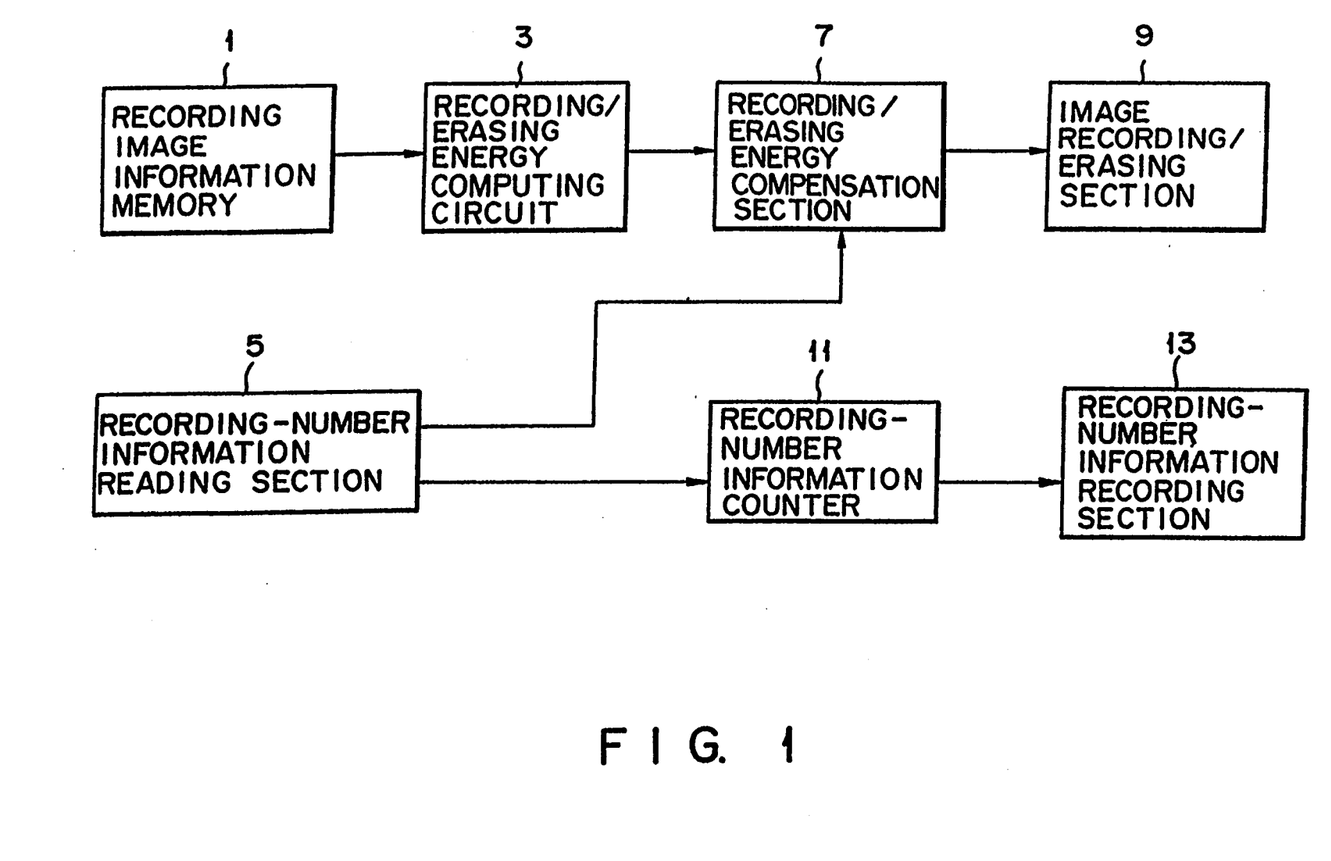
FIG. 1 is a functional block diagram schematically showing the functions performed by a recording apparatus according to one embodiment of the invention.

FIG. 1 is a functional block diagram showing a functions performed by a recording apparatus according to this embodiment.

As shown in FIG. 1, image information to be recorded on an recording medium is stored in the image information memory 1. The image information includes recording pixel data specifying a image to be recorded on a recording medium and erasing pixel data specifying erasing area on which no image formed. The recording/erasing energy computing circuit 3 computes the recording/erasing energy based on the image information in that memory 1. Recording-number information specifying repeat times of recording on the recording medium is read out from a magnetic recording region or section of a recording medium, such as a passenger ticket or pass, which is described later with reference to FIG. 3, by a recording-number information reading section 5. The recording/erasing energy (at least the recording energy) computed by the computing circuit 3 is compensated by a recording/erasing energy compensating section 7 based on a compensation energy information. The recording/erasing energy compensating section 7 includes RAM, CPU and a recording/erasing energy compensation ROM, described later. The recording/erasing energy compensation ROM stores the various compensation energy information relating the recording-number information and one of the compensation energy information is selected in accordance with the recording-number information read by the reading section 5. The recording/erasing energy output from the compensating section 7 is selectively applied to the image recording layer of the recording medium so that a visible image is formed on the recording medium by an image recording/erasing section 9 which includes a thermal head and a thermal head driver.

The recording-number information read by the reading section 5 is updated by a recording-number information counter 11 which includes the CPU and the RAM so that the repeat number of recording is count up. The updated recording-number information is recorded on the magnetic recording region or section of the recording medium by a recording-number information recording section 13. The functional block shown in FIG. 1 is disclosed in U.S. Ser. No. 904,658, filed Jun. 26, 1992, Yamaguchi et. al which is hereby incorporated by reference.

Figure 2:
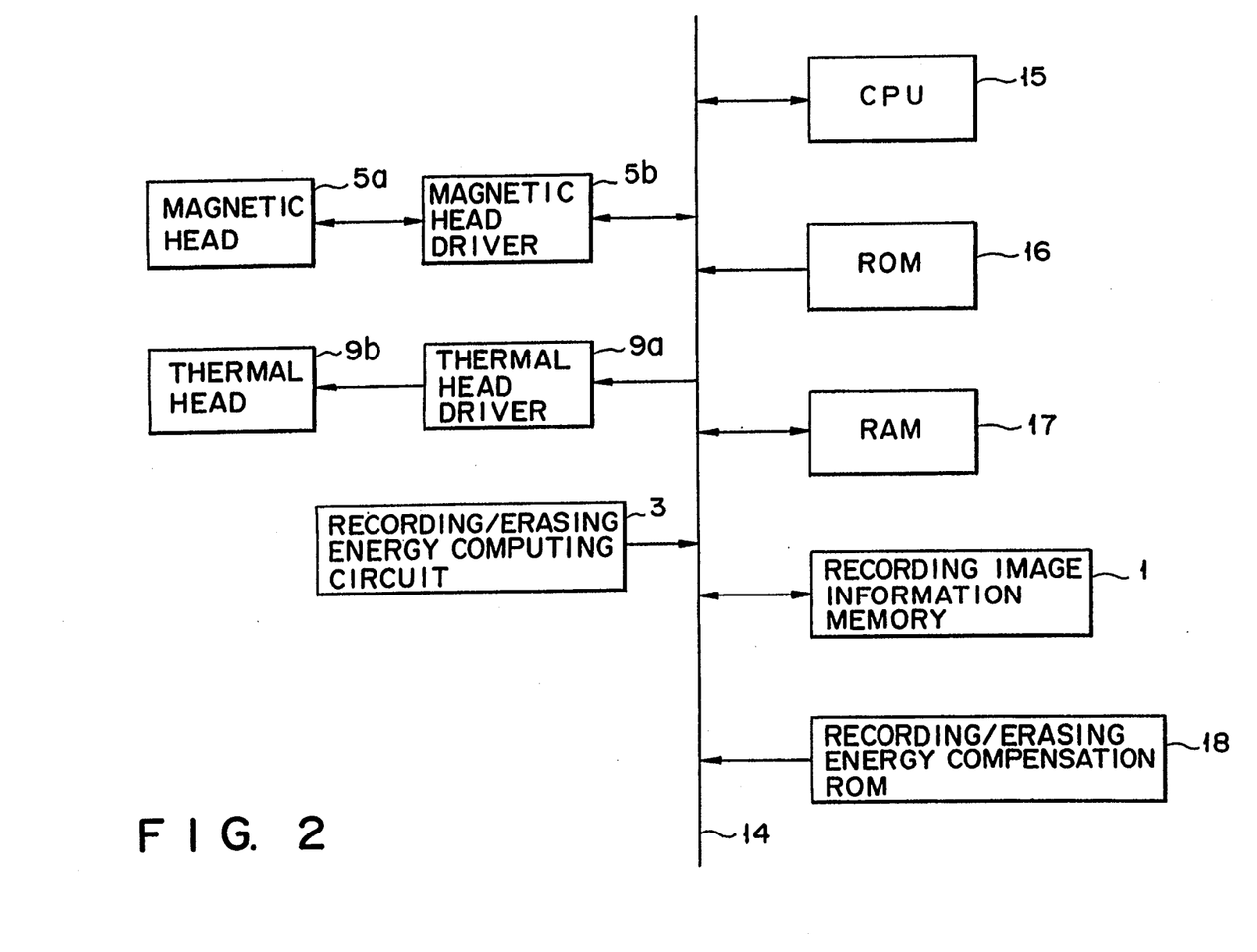
FIG. 2 is a block diagram schematically illustrating a circuit embodying the functional block shown in FIG. 1.

FIG. 2 is a block diagram showing a signal processing system of the recording apparatus, which is a digital system including CPU and embodying the apparatus of the invention. The recording-number information reading section 5, the image recording/erasing section 9 and so on are connected, via a bus line, to the CPU 15, ROM 16 and RAM 17 which control sections or parts connected thereto. The CPU 15 performs following operations based on control programs stored in the ROM 16 and the RAM 17 stores various data such as read out data from the information reading section 5 and calculated data under the control of the CPU 15.

The CPU 15 counts up the recording-number or repeat number at which the recording and erasing operations are performed on the recording medium and which is magnetically read from the recording medium by the magnetic head 5a and the magnetic head driver 5b constituting the recording-number information reading section 5. The count-up result of the recording-number is supplied to the magnetic head 5a through the magnetic head driver 5b from the CPU 15 and is magnetically recorded on the recording medium by the magnetic head 5a.

The CPU 15 converts a character data stored in the ROM 16 into an image or pixel data specifying pixels of the visible image to be recorded on the recording medium and stores the image data in the image information memory 1. The CPU also drive the recording/erasing energy calculation circuit 3 so the calculation circuit 3 calculates the recording/erasing energy for the respective pixels based on the image information stored in the image information memory 1.

A plurality of compensation values for compensating the recording/erasing energies, which relate to the respective recording-numbers, are stored in a recording/erasing energy compensation ROM 18. The CPU 15 selects one of the recording/erasing energy compensation value from the recording/erasing energy compensation ROM 18 in accordance with the recording-number output from the magnetic head 5a. Furthermore, CPU 15 calculates energies for erasing the recorded image and recording the image to be recorded from the selected one of the recording/erasing compensation values and the calculation results output from the recording/erasing calculation circuit 3 and drives the thermal head driver 9a and the thermal head 9b constituting the image recording/erasing section to record image on the medium in accordance with the calculated energies.

Figure 3:
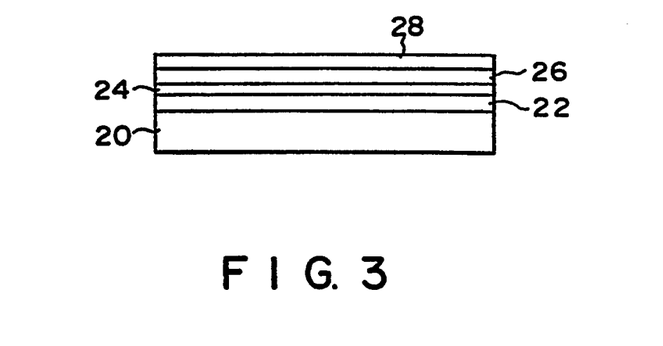
FIG. 3 is a cross-sectional view of a multi-layered recording medium.

As shown in FIG. 3, the recording medium, such as a pass, generally has a magnetic recording layer 22 formed on a base film 20, a coloring layer 24 formed on the magnetic recording layer 22, and an image recording layer 26 formed on the coloring layer 24. The last layer 26 can repeatedly change its state between an opaque state and a transparent state in accordance with the heat applied to the coloring layer 24. Formed on the recording layer 26 is a protection layer 28 which protects the underlying layer 26.

Figure 4:
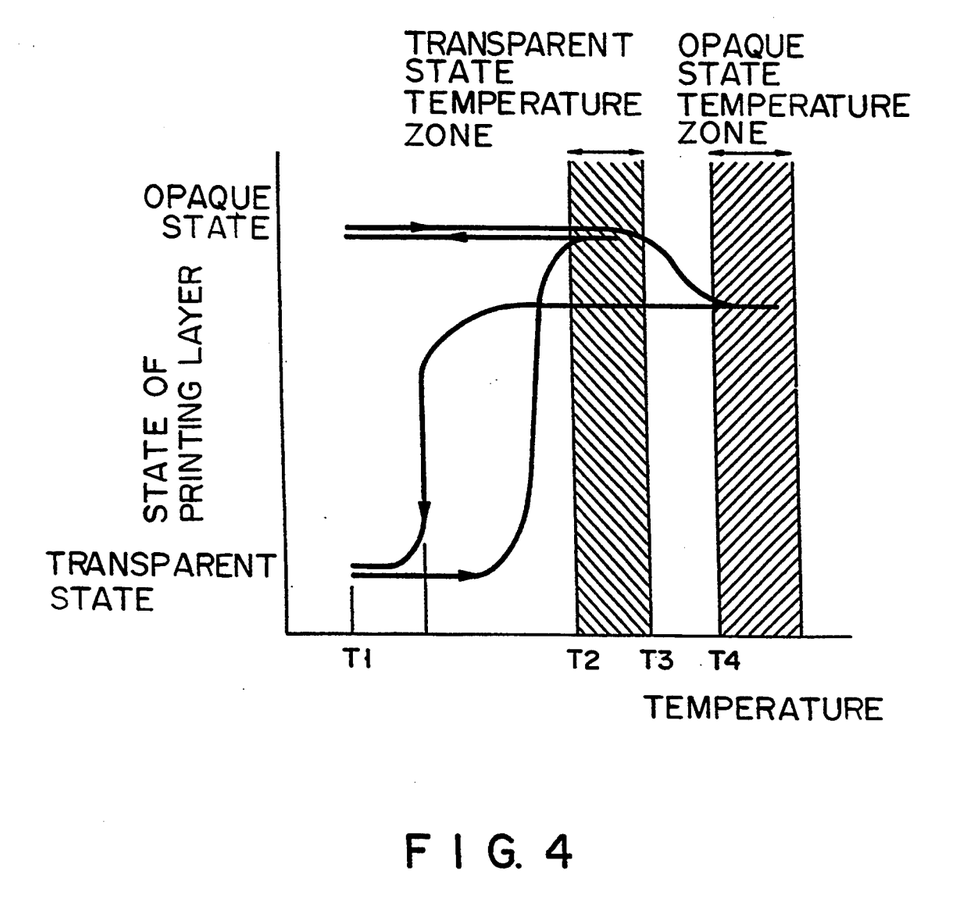
FIG. 4 is a graph showing the transition between an opaque state and a transparent state as the temperature changes.

In this recording medium 28, as shown in FIG. 4, with the image recording layer 26 initially in a transparent state, the image recording layer 26 stays transparent as the temperature of that layer 26 rises from T1 (room temperature) to a temperature range between T2 and T3 ($T1<T2<T3$), and becomes opaque from the transparent state when the temperature returns to T1. When the temperature rises above T4 ($T3<T4$) from T1, and then returns to T1 again, this recording layer 26 becomes transparent again and stays so thereafter. The image recording layer 26 has such a characteristic as to be able to repeat this transition.

A description will now be given of the operation to record and erase a visible image on the recording medium, which allows repetitive recording and erasing of a visible image on and from the image recording layer 26 that will show reversible transition between opaque and transparent states by the application of heat, and which has the magnetic recording layer 22 on which recording-number information indicating the number of times visible images have been recorded.

First, the recording/erasing energy computing circuit 3 refers to the information of pixels to be recorded or erased now (hereinafter called "target pixels") from the image information memory 1 to compute the recording energy when the target pixels to be recorded are mark dots (image forming pixels) for forming an image or the erasing energy when the target pixels are space dots (not image forming pixels) which do not form an image.

The recording-number information reading section 5 reads out recording-number information for the previous recording from the magnetic recording layer 22 of the recording medium, and sends that information to the recording/erasing energy compensating section 7 and the recording-number information counter 11. The compensating section 7 compensates for the recording/erasing energy, computed by the computing circuit 3, based on the recording-number information from the reading section 5, and then supplies the compensated energy to the image recording/erasing section 9.

In accordance with the pixel information, the image recording/erasing section 9 selectively applies the recording energy to mark dots and the erasing energy to space dots through the thermal head 9b (heating and recording means), thereby recording a new image over an old image on the recording layer 22 of the recording medium 28.

The recording-number information counter 11 updates the recording-number information from the recording-number information reading section 5, and sends the updated information to the recording-number information recording section 13. The recording section 13 records the updated recording-number information from the counter 11 on the magnetic recording layer 22 of the recording medium as new recording-number information.

According to this embodiment, based on the number of repeated recordings of visible images on the recording medium, the recording/erasing energy (at least the recording energy) is compensated by an operation which will be described later.

Figure 5:
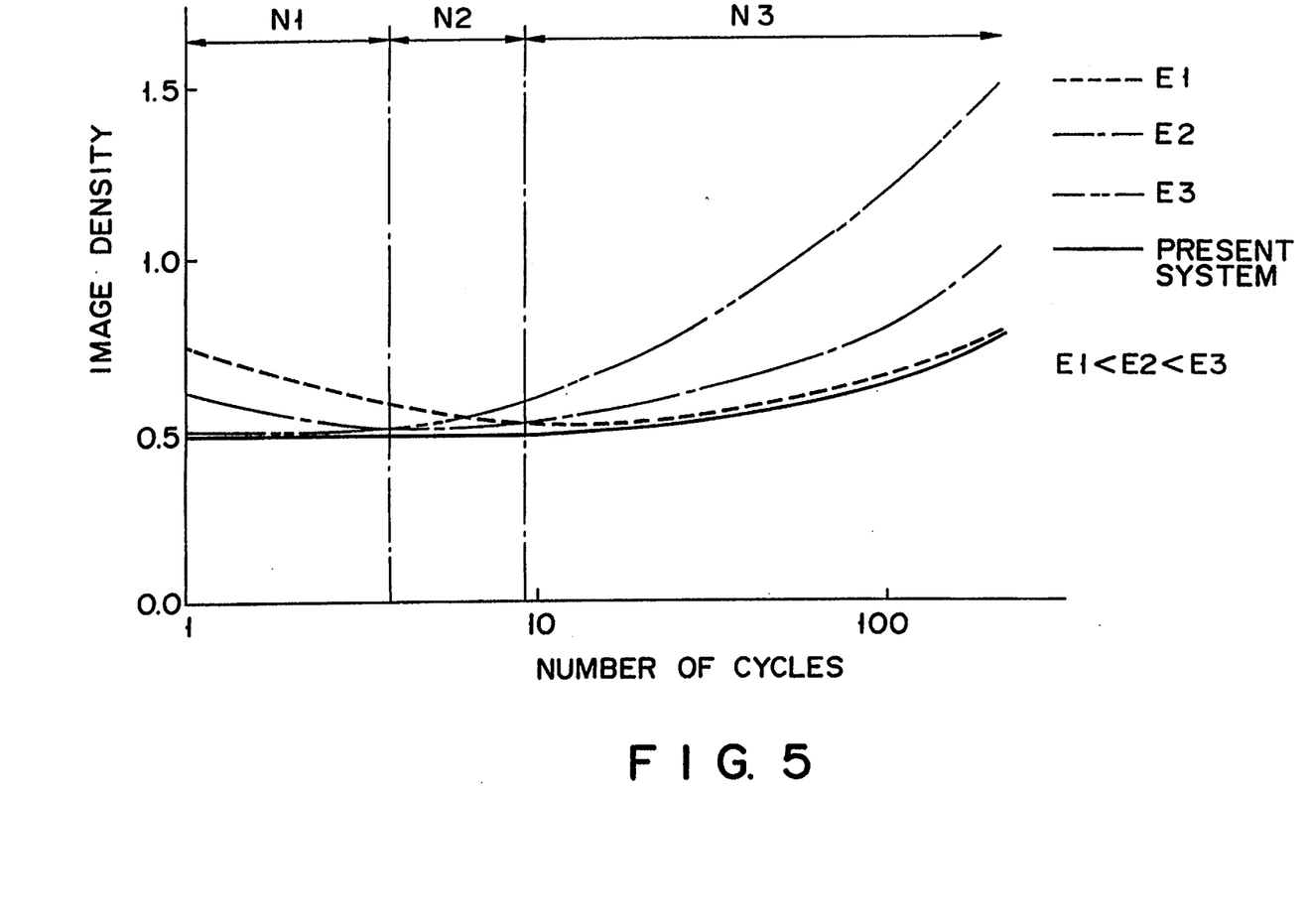
FIG. 5 is a diagram showing the relationship between the opaque image density of a recording medium made by a thermal head and the number of cycles.

FIG. 5 shows the relationship between the opaque image density and the number of cycles each consisting of image recording (opaque state) on the recording layer of the recording medium made by the thermal head (selectively heating means) of the image recording/erasing section 9, which relationship was obtained through experiments. The influence of the recording energy on the relationship between the opaque image density and the number of cycles was examined while changing the recording energy from E1 to E2, then to E3 ($E1<E2<E3$). The erasing energy was the same. The vertical scale of the graph represents the image density. As the value becomes smaller, the opaque state increases and the recording is saturated, while as the value becomes larger, the image becomes more transparent, indicating that the image is erased. For this recording medium, the saturated opaque image density at the recording time is about 0.5 while the maximum transparent density at the erasing time is about 1.5.

In FIG. 5, the initial opaque image density is insufficient with the smallest recording energy E1 (broken line). The recording density decreases when the cycle number ranges from one to about ten, but increases after the tenth cycle. With the largest recording energy E3 (alternate long and two short dashes line), the initial opaque image density is sufficient and the saturated density is maintained in several cycles, but the density rapidly increases after about tenth cycle and reaches the transparent density after 100 cycles even though recording is performed. In this case, the allowable number of cycles is about ten. The curve for the recording energy E2 (alternate long and short dash line) shows the behavior between those of E1 and E3.

It is desirable that in over-recording of a visible image, even when the number of cycles increases, the density at the recording time is kept at the saturated density and never changes. In this sense, while the recording energy E3 keeps the saturated density in first several cycles, it becomes unusable as the cycle number increases. The recording energy E1, on the other hand, provides a recording density closest to the saturated density for a large number of cycles, but provides an opaque image density too low to accomplish satisfactory recording when the cycle number is equal to or below ten. If recording is performed with the energy E3 in an interval N1, E2 in an interval N2 and E1 in an interval N3, it is possible to accomplish the recording with a density which covers the aforementioned three curves and is close to the saturated density.

Figure 6:
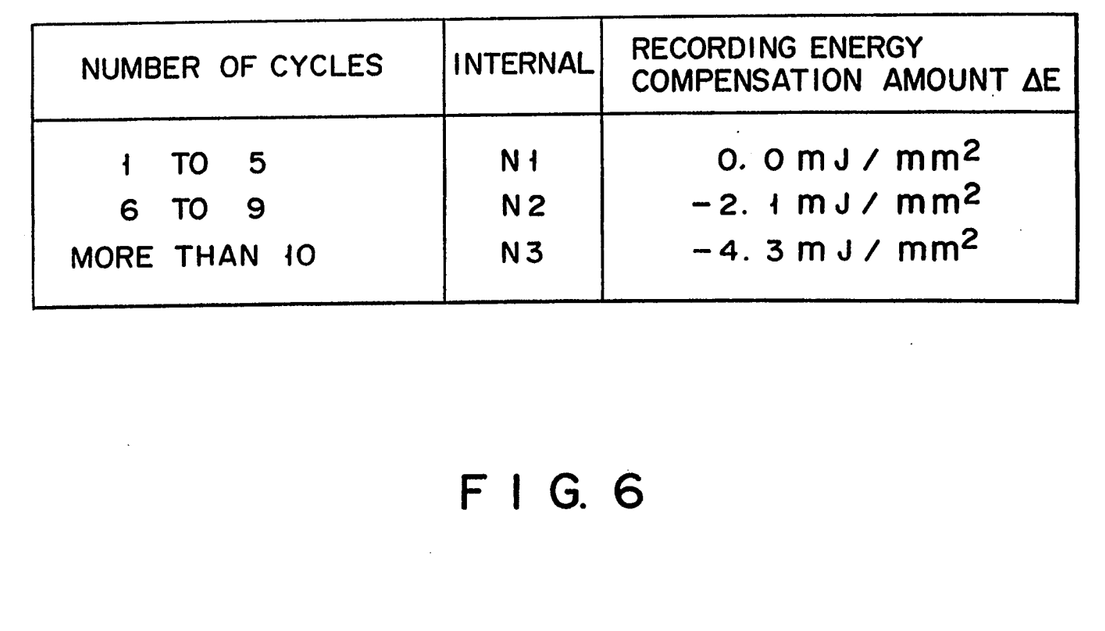
FIG. 6 shows a compensation table for compensating for recording/erasing energy.

In this embodiment, energy compensation is carried out using the compensation table (see FIG. 6) stored in the recording/erasing energy compensation ROM 18. The number of recordings is separated into a plurality of blocks, N1, N2 and N3 in this example, in accordance with the order of the repetitive recordings, recording/erasing energy compensation amounts $\Delta E$ are defined in association with the blocks N1, N2 and N3, and those pieces of data are arranged into the compensation table as shown in FIG. 6. This table is stored in the memory 18. The recording/erasing energy compensating section 7 refers to the compensation table based on the input recording-number information (=cycle number) to read out the associated recording/erasing energy compensation amount $\Delta E$ from this table, and compensates for the recording/erasing energy based on this amount $\Delta E$.

Figure 7A:
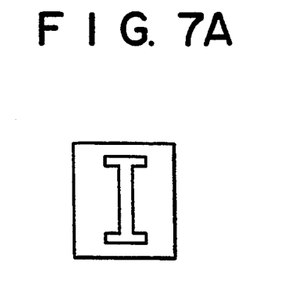
FIGS. 7A, 7B and 7C are diagrams for explaining how overwriting is carried out.
Figure 7B:
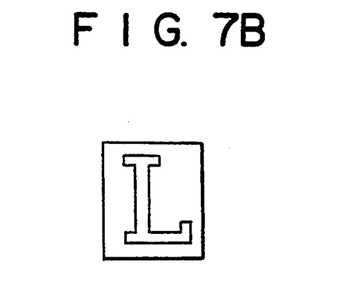

The over-recording operation will be described below referring to FIGS. 7A, 7B and 7C. First, assuming a letter "I" has been recorded on a recording medium as shown in FIG. 7A and another letter "L" is to be recorded over the former letter as shown in FIG. 7C, over-recording goes through the process shown in FIG.

7B. A row of heating resistors 30 of the thermal head 9 are arranged perpendicular to the recording direction and are in contact with the recording medium 28. There are a sufficient number of heating resistors in the resistor row 30 to record an image fully across the recording medium 28.

Figure 7C:
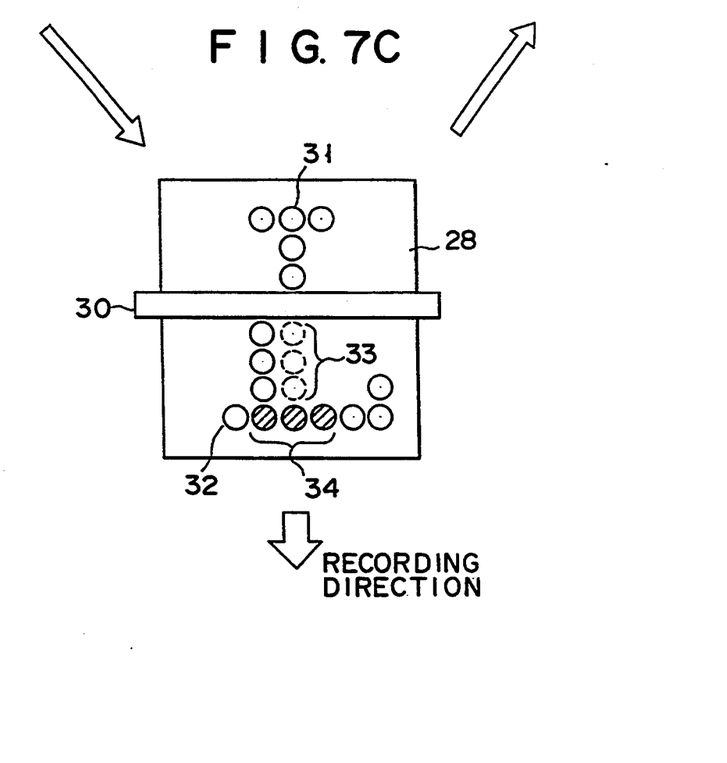

In FIG. 7C, "31" indicates a part of the image "I" already recorded, "32" indicates a part of the currently recording image "L," "33" indicates part of the erased image "I" and "34" is a re-recorded portion. In recording an image on the recording medium, those heating resistors 30 which correspond to target pixels (mark dots) should be heated to a temperature at which the recording medium becomes opaque, irrespective of the previous image thereon. In erasing the image, those heating resistors 30 which correspond to target pixels (space dots) should be heated to a temperature at which the recording medium becomes transparent, irrespective of the previous image thereon.

The new image 32 can be recorded while erasing the old image 31 by selectively heating the heating resistors 30 of the fixed thermal head 9b while feeding the recording medium under those heating resistors 30 in the above manner.

The recording layer of the recording medium used in this example becomes transparent at about 70° to 100° C. and has a saturated opaque state at about 110° C. or above. The upper limit of the heating temperature, which is determined by the durability of the protection layer or the recording layer, was about 160° C. for this recording medium 28.

The relationship between the opaque image density made by the thermal head and the number of cycles in the case where over-recording is performed by the recording apparatus of this invention was examined through experiments. The results were similar to those shown in FIG. 5, which proves that the present invention is effective even in an over-recording operation.

In short, according to this embodiment, a magnetic recording portion is provided on a recording medium, recording-number information indicative of the number of recordings is recorded on this magnetic recording portion, this recording-number information is read out therefrom at the time of over-recording a visible image on the recording medium, and the recording/erasing energy is compensated based on the read recording-number information. Accordingly, a stable recorded image can always be attained irrespective of the number of recording/erasing cycles. It is also possible to record a new visible image over the old visible image which has already been formed on the recording medium. In addition, recording and erasing can be executed with single energy applying means.

Although the opaque state of the recording layer is treated as a recorded image in the above embodiment, the opaque state may be set as the initial state so that the transparent state provides a recorded image.

Although the foregoing description of this embodiment has been given with reference to the case where the recording-number information is recorded as magnetic information on the recording medium, the present invention is in no way limited to this particular type. For instance, the present invention may employ a recording system of using punched holes and the position of those holes as used for prepaid cards which are now popular to pay for telephone charges and train or taxi fares. As the punched holes in the today's system indicate the remaining amount of credits, however, the interval between holes is wide for a large amount of usage at a time and is narrow for a short amount of usage. To adapt this system in the present invention, therefore, it is necessary to indicate how much has been used, not how much is left.

The present invention can thus provide a recording apparatus capable of always making a stable recorded image irrespective of the number of recording/erasing cycles, and capable of recording a new visible image over an already-recorded image.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of recording an image on a recording medium to which a first energy having a predetermined level is applied to record the image and to which a second energy different from the first energy is applied to erase the image, thereby the image being capable of recording and erasing repeatedly, the recording medium having a region to which times of recording the image is stored, said method comprising the steps of:
   reading the recording times from the region of the recording medium;
   compensating the first energy by changing the predetermined level from a first level to a second level in accordance with the recording times; and
   recording the image on the recording medium with a recording energy having the second level.

2. A method according to claim 1, further comprising the steps of:
   updating the recording times and recording the updated recording time on the region of the recording medium.

3. A method according to claim 1, wherein said recording step includes a step of applying a heat energy to the recording medium.

4. A method according to claim 1, wherein the region of the recording medium includes a magnetic recording section and said reading step includes a step of recording a magnetic data specifying the recording times on the magnetic recording section.

5. A method according to claim 1, wherein said compensating step includes steps of selecting a compensation value from a plurality of compensation values in accordance with the recording times and calculating the second level with reference to the compensation value.

6. An apparatus for recording an image on a recording medium to which a first energy having a predetermined level is applied to record the image and to which a second energy different from the first energy is applied to erase the image, thereby the image being capable of recording and erasing, repeatedly, the recording medium having a region to which times of recording the image is stored, said apparatus comprising:
   means for reading the recording times from the region of the recording medium;
   means for compensating the first energy by changing the predetermined level from a first level to a second level in accordance with the recording times; and means for recording the image on the recording medium with a recording energy having the second level.

7. An apparatus according to claim 6, further comprising:
   means for updating the recording times and recording the updated recording time on the region of the recording medium.

8. An apparatus according to claim 6, wherein said recording means includes means for applying a heat energy to the recording medium.

9. An apparatus according to claim 6, wherein the region of the recording medium includes a magnetic recording section and said reading means includes means for recording a magnetic data specifying the recording times on the magnetic recording section.

10. An apparatus according to claim 6, wherein said compensating means includes means for storing a plurality of compensation value, means for selecting a compensation value from the compensation values in accordance with the recording times and calculating the second level with reference to the compensation value.

* * * * *